United States Patent [19]

Kumazawa

[11] Patent Number: 4,722,235

[45] Date of Patent: Feb. 2, 1988

[54] POWER TAKEOFF APPARATUS FOR OFF THE ROAD VEHICLE

[75] Inventor: Toshiharu Kumazawa, Iwata, Japan

[73] Assignee: Yamaha Hatsudoki Kabushiki Kaisha, Iwata, Japan

[21] Appl. No.: 754,824

[22] Filed: Jul. 12, 1985

[30] Foreign Application Priority Data

Jul. 13, 1984 [JP] Japan ................ 59-144338

[51] Int. Cl.$^4$ ............................................. F16H 37/00
[52] U.S. Cl. .................. 74/15.66; 74/15.88; 74/15.86; 180/215; 180/292; 180/297
[58] Field of Search .......... 74/15.66, 15.86, 15.88; 180/215, 297, 292

[56] References Cited

U.S. PATENT DOCUMENTS

| | | | |
|---|---|---|---|
| 1,487,445 | 3/1924 | Dickinson | 74/15.86 X |
| 1,559,629 | 11/1925 | Leake | 74/15.66 X |
| 2,506,671 | 5/1950 | Jacobi | 74/15.66 X |
| 2,945,382 | 7/1960 | Ritter et al. | 74/15.88 X |

FOREIGN PATENT DOCUMENTS

| | | | |
|---|---|---|---|
| 1219335 | 6/1966 | Fed. Rep. of Germany | 74/15.66 |
| 1101679 | 10/1955 | France | 74/15.66 |
| 76973 | 12/1961 | France | 74/15.66 |
| 1066044 | 4/1967 | United Kingdom | 74/15.2 |

*Primary Examiner*—Dirk Wright
*Attorney, Agent, or Firm*—Ernest A. Beutler

[57] ABSTRACT

An off the road vehicle embodying an engine, transmission assembly including a primary change speed transmission and an auxiliary change speed transmission with the engine crankshaft and primary and auxiliary transmission shafts all extending transversely relative to the longitudinal axis of the vehicle. Certain of the transmission driven shafts extend through the respective transmission casings to provide auxiliary power takeoffs.

12 Claims, 4 Drawing Figures

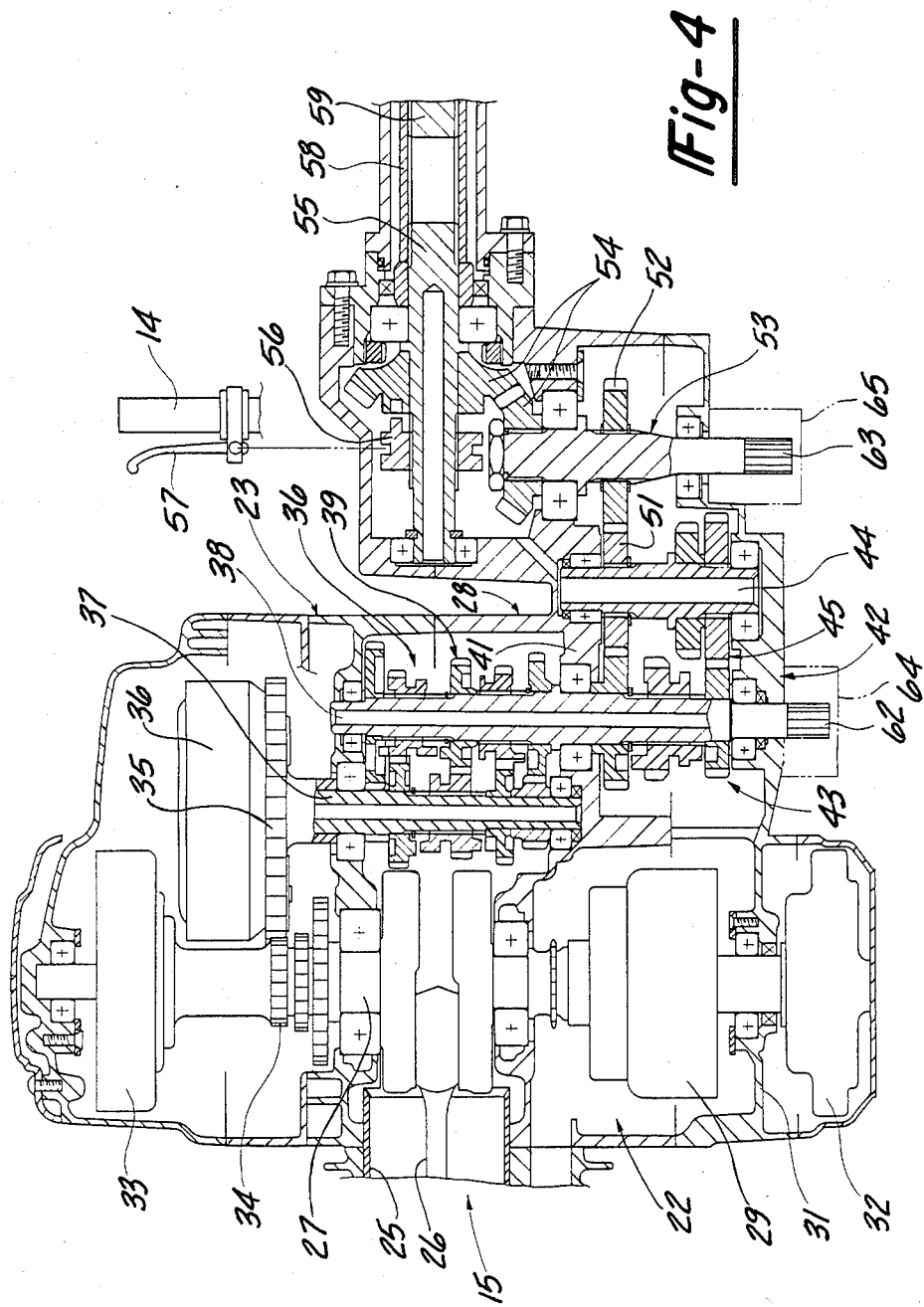

POWER TAKEOFF APPARATUS FOR OFF THE ROAD VEHICLE

BACKGROUND OF THE INVENTION

This invention relates to a power takeoff apparatus for an off the road vehicle and more particularly to an improved engine, transmission and power takeoff assembly for such vehicles.

Recently, a number of off the road type vehicles embodying balloon, low pressure tires have been proposed for recreational purposes. These vehicles may be of either the two, three or four wheel type and generally include a combined engine and change speed transmission assembly that is employed for driving at least one of the wheels for powering the vehicle over uneven terrain as is encountered in off the road use. Although such vehicles were primarily intended for recreational purpose, it has now become realized that these vehicles may be used for work as well as for pleasure. For example, such vehicles can be readily employed for use in connection with the driving of agricultural implements if they are provided with a power takeoff wherein the engine can be employed for driving such implements. In addition to agricultural uses, various other uses for such power takeoff equipped off the road vehicles will present themselves to those skilled in the various arts wherein such vehicles are employed.

Although the advantages of employing such a power takeoff are now being realized, the incorporation of a power takeoff in the conventional off the road vehicle proposes many problems. For example, such vehicles are extremely compact and are intended to be driven and utilized by only a single rider. Thus, it is important to maintain a relatively compact nature and the provision of power takeoffs of the conventional type with such vehicles defeats this purpose.

It is, therefore, a principal object of this invention to provide an improved and simplified power takeoff arrangement for the engine transmission assembly of an off the road vehicle.

It is a further object of this invention to provide an improved and simplified power takeoff arrangement for an off the road vehicle.

It is a yet further object of this invention to provide a simplified power takeoff for an off the road vehicle that does not add to the number of shafts or components of the engine transmission assembly.

SUMMARY OF THE INVENTION

This invention is adapted to be embodied in a transmission and power takeoff arrangement for an off the road vehicle having an engine and transmission assembly comprising a main casing containing a crankshaft having its axis of rotation extending transversely relative to the longitudinal axis of the vehicle and a primary change speed transmission within the main casing and including at least one driven shaft rotatable about an axis disposed parallel to the crankshaft axis. An auxiliary transmission is contained within a casing and is driven by the change speed transmission and has at least one driven shaft rotatable about an axis that is parallel to the crankshaft axis. A final drive is also provided in the auxiliary transmission and is driven by the auxiliary transmission drive shaft for driving at least one wheel of the vehicle. In accordance with the invention, at least one of the driven shafts has an end that extends through the respective casing and which provides means for providing a power takeoff for driving an implement or the like from the engine.

BRIEF DESCRIPTION OF THE DRAWINGS

FIG. 4 is a horizontal cross-sectional view taken through the transmission assembly and on an enlarged scale.

DETAILED DESCRIPTION OF THE PREFERRED EMBODIMENT

Figure 1:
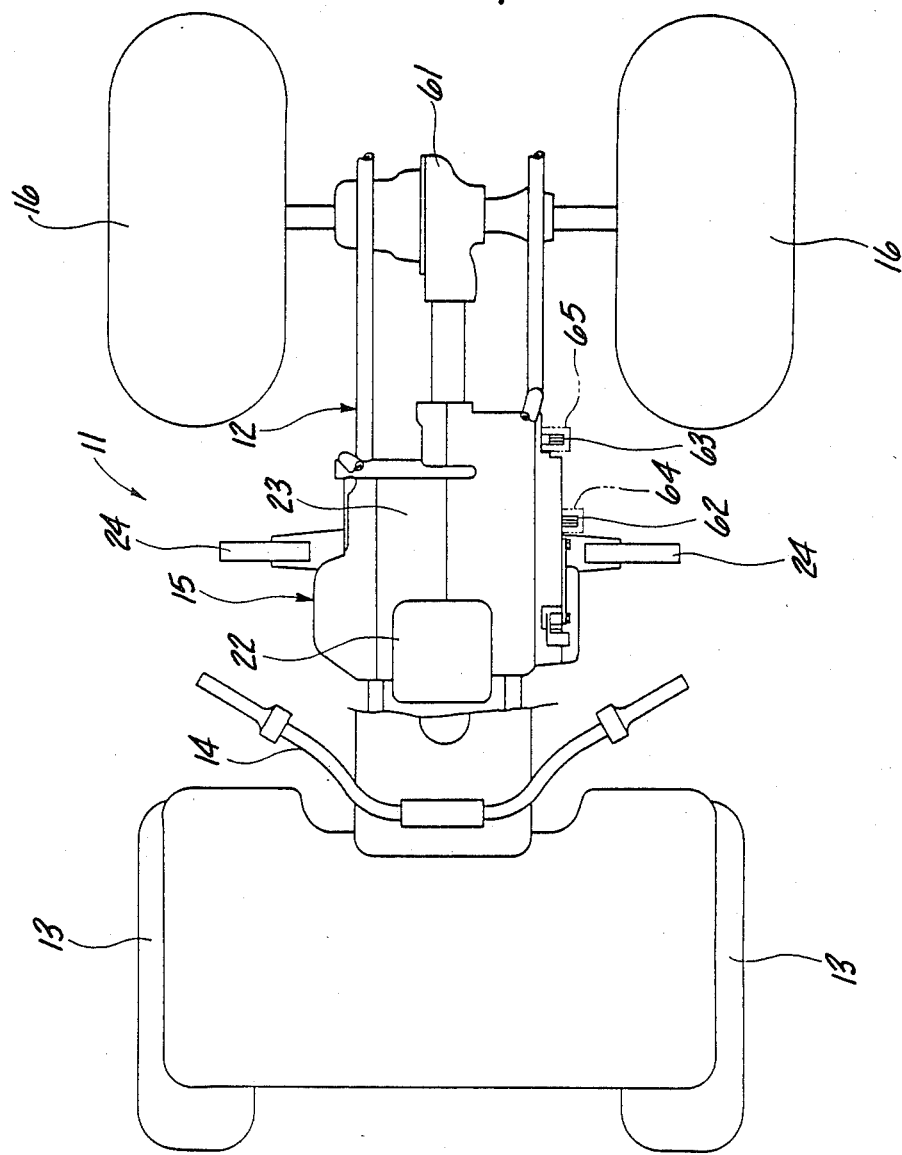
FIG. 1 is a top plan view of an off the road vehicle constructed in accordance with an embodiment of the invention.
Figure 2:
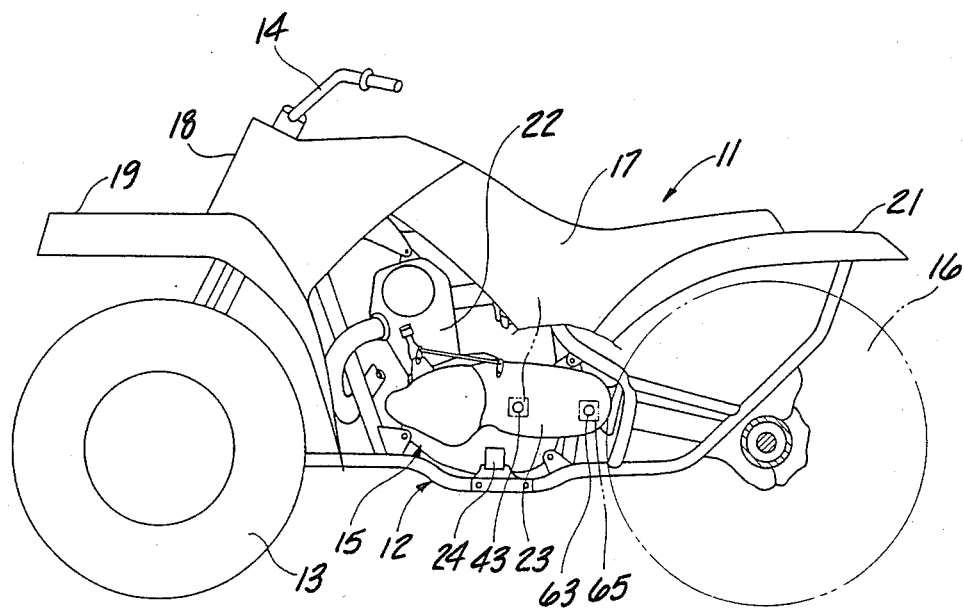
FIG. 2 is a reduced scale side elevational view of the vehicle.

Referring first to FIGS. 1 and 2, an off the road vehicle constructed in accordance with an embodiment of the invention is identified generally by the reference numeral 11. The vehicle 11 includes a frame assembly 12 that supports at its forward ends a pair of balloon tired front wheels 13 that are supported for steering movement in any suitable manner by the frame assembly 12 and which steering movement may be controlled by a handlebar assembly 14.

A combined engine transmission assembly, indicated generally by the reference numeral 15, is carried by the frame assembly 12 and is adapted to drive a pair of balloon tired rear wheels 16 in a manner to be described. The balloon tire wheels 13 and 16 are adapted to contain wide width tires of low pressure, for example, pressures in the range of 0.1 to 0.3 $kg/cm^2$.

A seat 17 is carried by the frame assembly 12 in overlying relationship to the engine transmission assembly 15 and is designed so as to accommodate primarily a single rider. In addition, a body consisting of a front cowling 18 and a front fender 19 is carried by the frame assembly 12. Furthermore, a pair of rear fenders 21 are carried by the frame in underlying relation to the seat 17 and in overlying relationship to the balloon tired rear wheels 16.

The engine transmission assembly 15 includes an internal combustion engine which is, in the illustrated embodiment, of the single cylinder reciprocating type and which is identified by the reference numeral 22. The engine transmission assembly 15 further includes a combined crankcase transmission assembly, indicated generally by the reference numeral 23 and which includes a main transmission, as to be described, and an auxiliary transmission which in turn drives a drive shaft in a manner to be described. A pair of foot pegs 24 are carried by the frame assembly 12 on opposite sides of the engine transmission assembly 15 so as to accommodate the feet of a rider seated on the seat 17.

Figure 3:
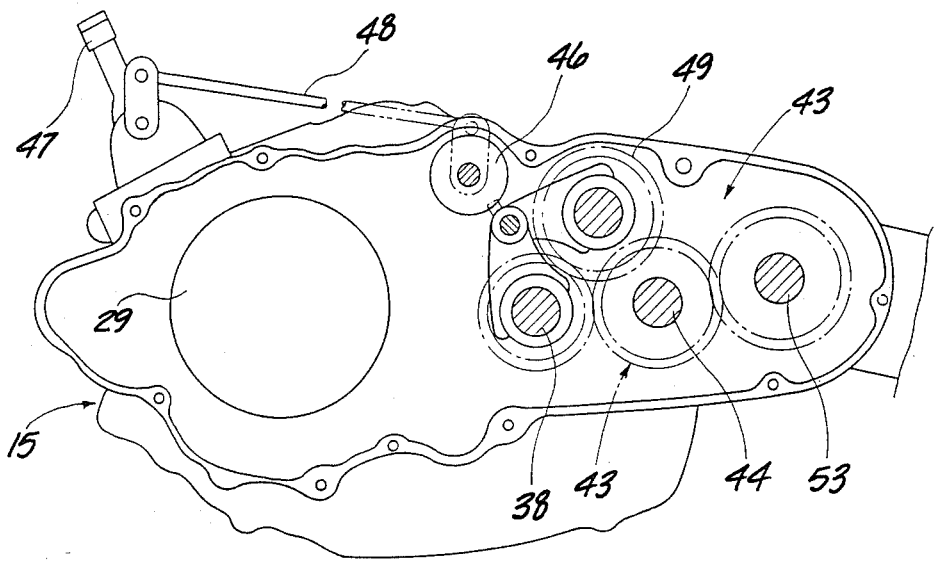
FIG. 3 is an enlarged side elevational view, with portions removed, showing the transmission assembly.

Referring now primarily to the remaining figures (FIGS. 3 and 4), the engine 22, which as has been noted is of the single cylinder type, includes a cylinder liner 25 in which a piston (not shown) is supported for reciprocation. The piston is connected by means of a connecting rod 26 to a crankshaft assembly 27. The crankshaft assembly 27 is contained within the crankcase transmission assembly 23 and specifically within a main casing assembly 28 of it. The crankshaft 27 is supported for rotation about an axis that extends transversely to the longitudinal axis of the vehicle 11. A generator or alternator 29 is carried by one side of the crankshaft 27 within the casing 28 and provides a suitable source of electrical power. A cover assembly 31 is affixed to the main casing assembly 28 and encloses the crankcase and contains the alternator 29 so that it will not be subject to the mud or other foreign matter which would normally be encountered due to the off the road use of the vehicle 11. A further cavity is provided within this cover 31 and a recoil starter 32 is contained therein and is affixed to the crankshaft 27 for pull starting of the engine in a known manner.

At its other side, the crankshaft 27 is coupled to a centrifugal clutch 33 which, in turn, drives an output gear 34. The output gear 34 drives an input gear 35 of the primary change speed transmission assembly, indicated generally by the reference numeral 36, and which forms a part of the engine transmission assembly 15. The input gear 35 is coupled to a multiple disk clutch 36 which, in turn, is selectively operable to drive a transmission primary shaft 37 that is journaled within the casing assembly 28 for rotation about an axis that is parallel to the axis of rotation of the crankshaft 27 and, accordingly, transversely disposed relative to the vehicle 11. The primary transmission 36 also includes a transmission secondary or driven shaft 38 that is supported within the casing assembly 28 for rotation about an axis parallel to that of the shaft 37 and that of the crankshaft 27. A plurality of change speed gears 39 are journaled upon the shafts 37 and 38 and are in mesh with each other for providing a selective driven speed of the driven shaft 38. A plurality of dog clutches are provided between the gears 39 and the respective shafts 37 and 38 so as to provide the selective speed ratio as is well known in this art.

The rotating transmission secondary shaft 38 extends through a side wall 41 of the main casing assembly 28 and into an auxiliary transmission casing assembly 42 which may be formed integrally with the cover 31. An auxiliary transmission, indicated generally by the reference numeral 43, is contained within this casing 42 and includes the extension of the primary transmission driven shaft 38. An idler shaft 44 is supported within the casing 42 and carries a plurality of gears 45 that mesh with like gears carried by the shaft 38 so as to provide selected high or low speed ratios between the shafts 38 and 44. Dog clutches operated by a shifting drum 46 and shift lever 47 (FIG. 3) through a link 48 are provided for selectively coupling the shafts 38 and 44 at the desired speed ratio. In addition, a reverse gear 49 is provided within the auxiliary transmission casing 42 so as to drive the shaft 44 from the shaft 38 and reverse gear 49 in an opposite direction. The reversing operation is also controlled by appropriate dog clutches that are operated by the shifting drum 36 in a known manner.

The idler shaft 44 has an output gear 51 that is enmeshed with a gear 52 carried by a driven shaft 53 of the auxiliary transmission 43. The driven gear 53 carries a bevel gear 54 that is enmeshed with a like bevel gear 54 that is rotatably journaled on an output shaft 55. The output shaft 55 is adapted to be selectively coupled to the gear 54 by means of a dog clutch 56 which is operated by means of a flexible transmitter and control lever 57 carried on the handlebar assembly 14.

A coupling 58 connects the output shaft 55 with a drive shaft 59 that extends through a protective casing and which drives the rear wheels 16 through a final drive assembly 61 (FIG. 1 in a known manner.

The driven shaft 38 of the primary transmission 39, in addition to extending through the casing wall 41, extends through the casing 42 of the auxiliary transmission 43 and has a splined outer end 62 that provides a power takeoff attachment for driving any of a plurality of types of implements such as agricultural implements. In a similar manner, the driven shaft 53 extends through this same wall and has a splined outer end 63 that is adapted to drive any suitable implements. The power takeoff shaft portions 62 and 63 are normally covered by protective covers 64 and 65 that are affixed to the auxiliary transmission casing 42 in a suitable manner.

It should be readily apparent that the power takeoffs 62 and 63 provide convenient power takeoffs that may be utilized to drive any of a variety of implements at respective speed ratios as chosen by the primary transmission assembly 39 in the case of the shaft 62 and by the combination of the primary and secondary transmission ratios as with the case of the power takeoff 63. In addition, the power takeoff 63 will rotate in either forward or reverse directions because of the incorporation of a reverse gear in the auxiliary transmission 43.

It is to be understood that the foregoing description is that of a preferred embodiment of the invention and that various changes and modifications may be made without departing from the spirit and scope of the invention, as defined by the appended claims.

I claim:

1. In a transmission and power takeoff arrangement for an off the road vehicle having an engine transmission assembly comprising a main casing containing a crankshaft having its axis of rotation extending transversely relative to a longitudinal axis of the vehicle, a primary change speed transmission within said main casing and including at least one driven shaft rotatable about an axis disposed parallel to said crankshaft axis, an auxiliary transmission contained within a casing and driven by said change speed transmission and having at least one driven shaft rotatable about an axis that is parallel to said crankshaft axis, and a final drive driven by said auxiliary transmission driven shaft for driving at least one wheel of said vehicle, at least one of said driven shafts having an end extending through the respective casing and providing a power takeoff for driving an implement or the like from the engine.

2. In a transmission and power takeoff arrangement as set forth in claim 1 wherein both of the driven shafts extend through the casings and provide respective power takeoffs.

3. In a transmission and power takeoff arrangment as set forth in claim 1 further including clutch means for selectively coupling the final drive to the auxiliary transmission driven shaft for disconnecting the final drive during power takeoff operation.

4. In a transmission and power takeoff arrangement as set forth in claim 1 wherein the primary change speed transmission driven shaft comprises a secondary shaft thereof and also extends into the auxiliary transmission casing for providing the input of the auxiliary transmission.

5. In a transmission and power takeoff arrangement as set forth in claim 4 wherein the driven shaft of the primary change speed transmission has its end extending beyond the auxiliary transmission casing for providing the power takeoff.

6. In a transmission and power takeoff arrangement as set forth in claim 5 wherein the auxiliary transmission driven shaft further extends through the auxiliary transmission casing for providing a second power takeoff.

7. In a transmission and power takeoff arrangement as set forth in claim 5 further including clutch means for selectively coupling the final drive to the auxiliary transmission driven shaft for disconnecting the final drive during power takeoff operation.

8. In a transmission and power takeoff arrangement as set forth in claim 6 further including clutch means for selectively coupling the final drive to the auxiliary transmission driven shaft for disconnecting the final drive during power takeoff operation.

9. In a transmission and power takeoff arrangement as set forth in claim 1 wherein the vehicle is a four-wheeled vehicle having a rider's seat adapted to accommodate only a single rider and having only a pair of driven wheels.

10. In a transmission and power takeoff arrangement as set forth in claim 9 wherein the power takeoff extends transversely relative to the vehicle.

11. In a transmission and power takeoff arrangement as set forth in claim 1 wherein the power takeoff extends transversely relative to the vehicle.

12. In a transmission and power takeoff arrangement as set forth in claim 2 wherein both of the power takeoff shafts extend transversely relative to the longitudinal axis of the vehicle.

* * * * *